Patented Aug. 31, 1926.

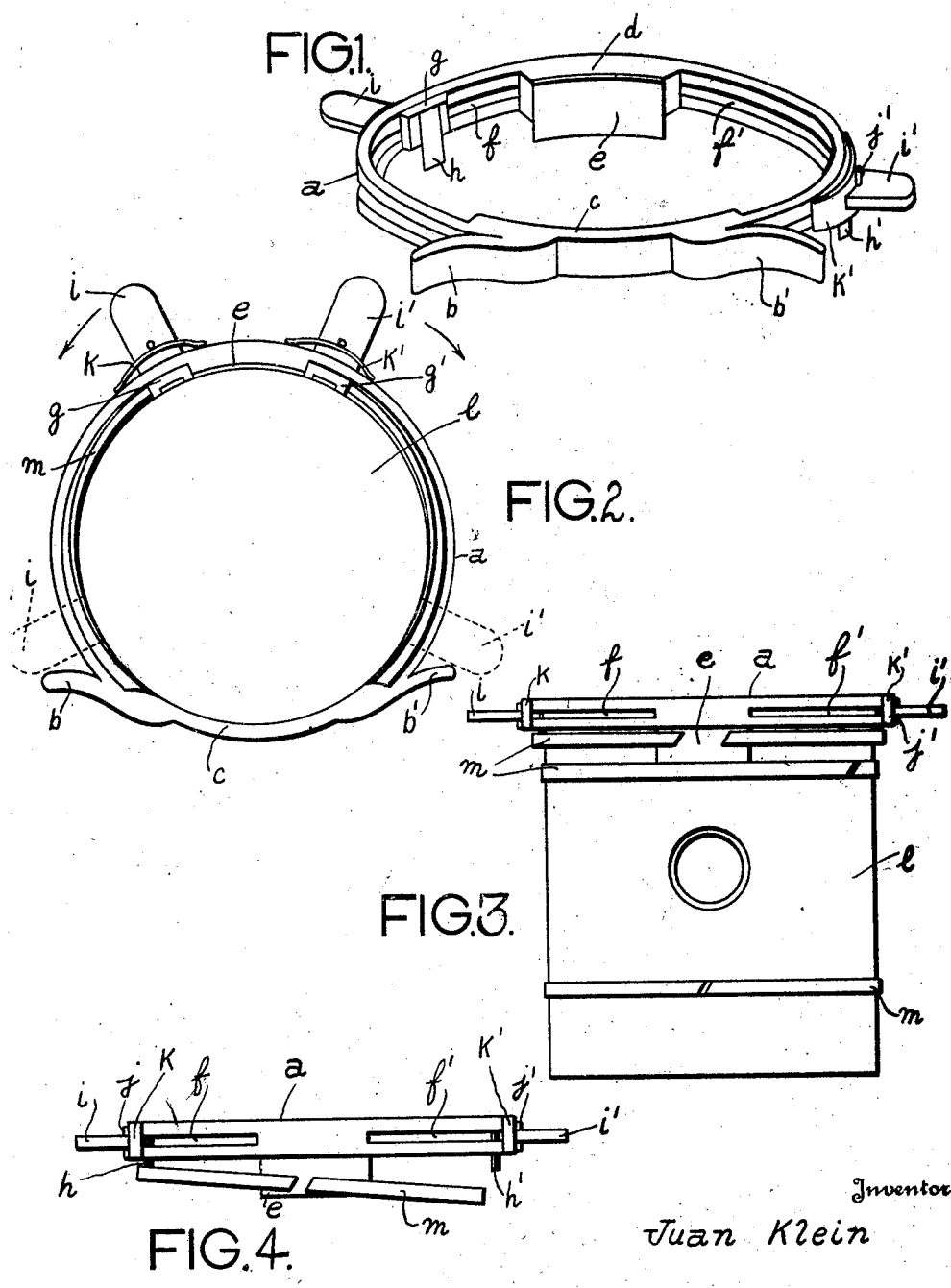

1,597,804

UNITED STATES PATENT OFFICE.

JUAN KLEIN, OF BUENOS AIRES, ARGENTINA.

PISTON-RING REMOVER.

Application filed June 25, 1925, Serial No. 39,589, and in Argentina May 28, 1925.

The subject-matter of the present invention is a piston ring removing tool, as the name implies, this is a tool designed to facilitate removal of piston rings from the pistons of internal combustion engines, steam engines, compressors and generally any machinery including pistons equipped with metal rings. Such rings are located in peripheral grooves provided in the pistons, and, their internal diameter being somewhat smaller than the external diameter of the piston itself, they have to be expanded in order to be able to slip over the latter, both when being mounted in place and when removed from the piston.

Usually the mounting of piston rings gives no trouble at all, it being sufficient to spring them open to a sufficient extent to permit placing them over the piston head, whence they may be easily pushed down until they locate themselves in their corresponding groove. The extraction of the rings from their grooves, however, has always been a cumbersome operation, it being necessary from time to time in order to thoroughly cleanse the piston, or for the purpose of replacing the piston rings with new ones if they are worn out through continued use. If it is attempted to spring the rings open with the hands, it either happens that the joint slips inside the groove, or else remains completely outside the latter but leaving the opposed end enclosed therein, locking the ring within and preventing edgewise movement thereof; if too much force is applied in expanding the piston rings, the latter are frequently bent or broken, due to the plastic and brittle nature of their material. The extraction of the piston rings is thus left to the greater or smaller degree of skill on the part of the operator, being frequently carried out by the use of circumstantial means, i. e. by the application of small bits of iron, screw drivers, or wires, as the occasion may offer, in order to hold the piston rings in open position to slip them past the edges of their grooves.

Obviously, much as the person engaged in removing the piston rings may be skilled in handling this work, the occasional breaking of piston rings or damages caused to the piston itself by way of scoring and wear of the edges, apart from the loss of time involved in the operation, is unavoidable.

In order to do away with the aforementioned troubles and provide a device appropriate for lifting the rings off the pistons without difficulties, promptly and without causing damages of any kind either to the rings or to the piston, I have devised the piston ring remover forming the subject-matter of the present invention, which by its simplicity and ease of operation not only is destined to constitute a valuable assistant in assembling and repair shops, but also to form part of the equipment of the motorist, motorcyclist, and any place where internal combustion or steam engines, compressors, or pumps are installed, such as factories, power plants, water craft, &c.

In order that the invention may be more clearly understood, it has been illustrated in the annexed drawings forming part of the present specification, wherein:—

Figure 1 is a perspective view of the piston ring remover according to the invention.

Figure 2 is a top plan view of the same, applied to a piston with the purpose of removing one of the piston rings.

Figure 3 is an elevation of an automobile piston, to the head of which the device according to this invention is applied while removing the first of the piston rings.

Figure 4 shows the piston ring remover, lifted off the piston and showing the removal of the piston ring.

Referring to Fig. 1 of the drawings, the piston ring remover includes an annular body $a$, provided at one portion of its external periphery with two curved handles or lugs $b$, $b'$, in fixed position. The internal periphery of the annular body $a$, facing the lugs $b$, $b'$, carries a segmental elevated portion $c$ diametrically and symmetrically facing this internal segment $c$, the internal periphery of the annular body $a$ carries another segmental elevated portion $d$, comprising a smaller angle than the first mentioned portion. The internal face of segment $d$ carries fastened thereto a steel blade $e$ projecting towards one side of body $a$ in an axial direction.

The two portions of body $a$ comprised between the sides of segments $c$ and $d$ are split by the slots $f$, $f'$, having mounted therein the sliding segments $g$, $g'$, which may slide from their initial position, where they are close to segment $d$, to the extreme position where they are set close to segment $c$, one at each side of the latter.

These sliding segments are located in the internal periphery of annular body $a$ each being provided with a small steel blade $h$, $h'$, respectively, similar to blade $e$ referred to above. The thickness of segments $g$, $g'$ is the same as that of the fixed segments $d$ and $c$, and the respective blades $h$, $h'$, project in axial direction towards the same side as the wider blade $e$. The position of each of segments $g$, $g'$, may be controlled from the outside by means of the lugs $i$, $i'$, projecting through the respective slots $f$, $f'$, being prevented from falling inwardly of the annular body $a$ by the locking pins $j$, $j'$ driven through said lugs. In order to provide for a smooth and sliding movement of the slides through the slots, each lug $i$, $i'$ carries, interposed, between the locking pins $j$, $j'$ and the external periphery of annular body $a$, a flat spring $k$, $k'$, tending to separate the locking pins $j$, $j'$ from the external periphery of annular body $a$, thus keeping the segments $g$, $g'$ firmly pressed against the internal periphery of said annular body.

Figure 2 of the drawings shows the piston ring remover according to the invention, as applied to the head of a piston $l$, for the purpose of removing one of the rings. This figure discloses most of the parts indicated in the preceding drawing in profile. As may be seen from the drawing, the tool has its slides $g$, $g'$ in the initial position, i. e. set close to the segmental portion $d$. The internal circle comprised between the segmental portions $c$, $d$, $g$, and $g'$, is corresponding to substantially the external diameter of the piston from which the rings are to be removed. In the initial position of the movable segments $g$, $g'$, the projecting steel blades $h$, $h'$ are set close to the fixed blade $e$, and in this position the three blades, $h$, $e$, and $h'$, may be inserted together between the piston ring $m$ and the wall of the piston $l$. To this end, the blade $e$ is inserted so it is located beneath the joint of the piston ring in order to prevent the ends of this joint from closing, due to their resiliency. (See Fig. 3). After inserting the three blades beneath the piston ring, the left hand thumb is placed against the fixed front lug $b$ and the movable lug $i$ is gripped by the left hand forefinger; in the same maner the right hand thumb is placed against the front lug $b'$ and the movable lug $i'$ is gripped by the right hand forefinger, simultaneously applying pressure against the lugs, $i$, $i'$, pulling them in the direction of the arrows (see Fig. 2, towards the respective fixed lugs $b$, $b'$, thus placing the segments $g$, $g'$ close against the segmental fixed portion $c$. Inasmuch as the steel blades $h$, $h'$ on the movable segments $g$, $g'$ are inserted beneath the piston ring $m$, these blades slide during the movement of said segments beneath the piston ring, until attaining with regard to the fixed blade $e$ and to each other, an approximate distance of 120 degrees, leaving the piston ring $m$ suspended between three points (see Figure 2). In such position, the piston ring is expanded under uniform tension remaining clear of the groove when the piston ring remover may be lifted off the piston $l$, carrying the ring $m$ suspended on its blades $h$, $e$, and $h'$. This is the position shown in Fig 3, disclosing clearly the expansion of the suspended piston ring, which may be seen by the increased diameter of the latter and by the widened gap at the center.

After lifting the piston ring remover off piston $l$, the piston ring $m$ may be easily slipped off the implement, by pushing it, thus leaving the implement ready to be used over again.

I claim as my invention:

1. Piston ring removing tool for pistons of all kinds equipped with metal rings, comprising an annualr body including in its internal periphery segmental elevated portions, the internal circle comprised between said segments corresponding substantially to the external periphery of the piston with which the said tool is to be used; a segmental blade fastened to one of said segmental projections, and a plurality of movable segmental blades, fastened to sliding segments movable along the internal periphery of the annular body, said segmental movable blades being able to be set close to said segmental fixed blade, all of said blades projecting towards one side of said annular body in an axial direction, in order to be inserted together beneath a portion of the piston ring to be removed, said movable blades being afterwards pulled apart from the fixed blade to be placed in position along the periphery of said annular body, at points substantially equidistant with regard to said fixed blade and to each other, for the purpose of expanding the piston ring leaving the latter uniformly suspended thereon to extract said piston ring from its groove and bringing it clear of the piston walls, in order to permit its removal without trouble and without causing damages to either the piston or the piston itself.

2. Piston ring removing tool for pistons of all kinds equipped with metal rings, in accordance with claim No. 1, characterized by the provision of fixed lugs on the external periphery of the annular body, in order to facilitate actuating the movable blades.

3. A piston ring remover comprising an annular body adapted to fit over a piston; means on said body adapted to be inserted between the piston ring at the end thereof and the piston; and means for expanding the ring from the ends thereof toward the intermediate section until the ring is clear of its respective groove so that it may be removed over the piston with the annular body, said second means being slidably mounted on said body.

4. A piston ring remover comprising an annular body adapted to fit over a piston; a blade secured to the body; and a second blade slidably mounted on said body, said blades being adapted to be inserted under the ends of the piston ring so that upon movement of the second blade toward the intermediate section of the ring until the ring is clear of its respective groove the ring may be removed over the piston together with the annular body.

5. A piston ring remover comprising an annular body adapted to fit over a piston; a blade secured to the body; and a pair of blades slidably mounted on said body on each side of said first-named blade, said blades being adapted to be inserted under the ends of the piston ring so that upon movement of the slidable blades toward the intermediate section of the ring until the ring is clear of its respective groove, the ring may be removed over the piston together with the annular body.

6. A piston ring remover comprising an annular body adapted to fit over a piston and having slots therein; a blade secured to the body; and a pair of spring-pressed blades slidably mounted in the slots of the body one on each side of said first-named blade, said blades being adapted to be inserted under the ends of the piston ring so that upon movement of the spring-pressed blades toward the intermediate section of the ring until the ring is clear of its respective groove, the ring may be removed over the piston together with the annular body.

7. A piston ring remover comprising an annular body adapted to fit over a piston and having slots therein; a blade secured to the body; and a pair of spring-pressed blades slidably mounted in the slots of the body one on each side of said first-named blade, said blades being adapted to be inserted under the ends of the piston ring so that upon movement of the spring-pressed blades toward the intermediate section of the ring until the ring is clear of its respective groove, the ring may be removed over the piston together with the annular body; and means for aiding the actuation of the spring-pressed blades.

In testimony whereof I affix my signature.

JUAN KLEIN.